UNITED STATES PATENT OFFICE.

BERNHARD WIENER, OF ST. PETERSBURG, RUSSIA, ASSIGNOR TO BRUNO HOFFMARK, OF SAME PLACE.

IMPROVEMENT IN THE MANUFACTURE OF GUNPOWDER.

Specification forming part of Letters Patent No. 148,536, dated March 10, 1874; application filed January 31, 1874.

*To all whom it may concern:*

Be it known that I, BERNHARD WIENER, of St. Petersburg, Russia, colonel of artillery, have invented or discovered certain new and useful Improvements in the Manufacture of Gunpowder; and I do hereby declare that the following is a full, clear, and exact description thereof—that is to say:

This invention consists in the manufacture of gunpowder by what I term the dry way. Instead of adding a certain quantity of water to the ingredients—saltpeter, sulphur, and charcoal, as in the ordinary mode of manufacture—after they have been mixed together in the mixing barrels or tubs, I submit the mixture, in a dry or unwetted state, to the action of a press, heated, preferably, by steam, to about 250° Fahrenheit (120° centigrade.) Under this temperature the sulphur melts and becomes thoroughly distributed throughout the mixture, thereby transforming the same into a compact black cake, perfectly homogeneous.

Prismatic or any other special kind of powder, of which each single grain requires to be pressed, is made by bringing the mixture from the mixing barrels or tubs directly into hot powder-presses, which produce grains of the desired form and size.

Granular powder is made by comminuting the dry paste or cake, and by then assorting and dusting the grains. Drying and glazing are unnecessary.

By the manufacture of gunpowder in the manner above described I obtain the following advantages: First, the effect of the powder in shooting is more uniform; second, the grains, although of an inferior specific gravity, are of firmer consistence; third, the powder attracts scarcely half the moisture attracted by powder made in the wet way; fourth, the destructive or wearing effect on the guns is much diminished; fifth, the manufacture is less complicated, is cheaper, quicker, and requires less hands; it does not depend on the weather, nor is it even hindered by hard frost; sixth, the ingredients are transformed in one day into gunpowder ready for use, which can, in the evening, be removed into the powder-cellars, while the ordinary method requires about a week, and necessitates large accumulations in the drying-house.

What I claim, and desire to secure by Letters Patent, is—

The improved method, herein described, for the manufacture of gunpowder without the aid of moisture, by subjecting the ingredients, after mixture, to a temperature sufficient to liquefy the sulphur and cause it to agglutinate the mass, substantially as set forth.

B. WIENER.

Witnesses:
HY SCHLENK,
    *Between the 15th and 16th line, No. 44, on Wassily Ostroff.*
J. KOS,
    *Officer Str. No. 7.*